Sept. 12, 1950 R. D. SMITH 2,522,066
AUTOMOBILE ALIGNMENT GAUGE
Filed Feb. 7, 1946 3 Sheets-Sheet 1

INVENTOR.
BY Roy D. Smith
Merrill M. Blackburn
Atty.

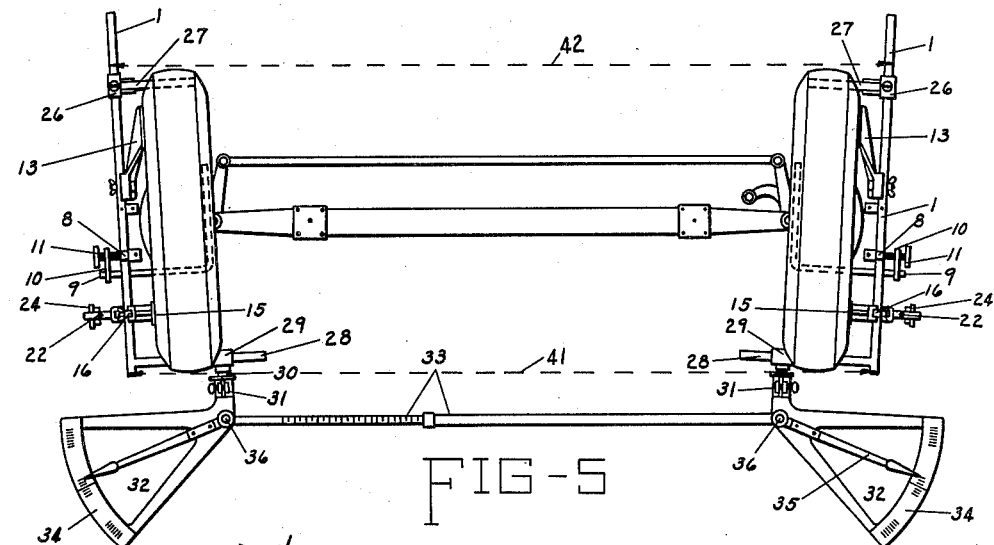
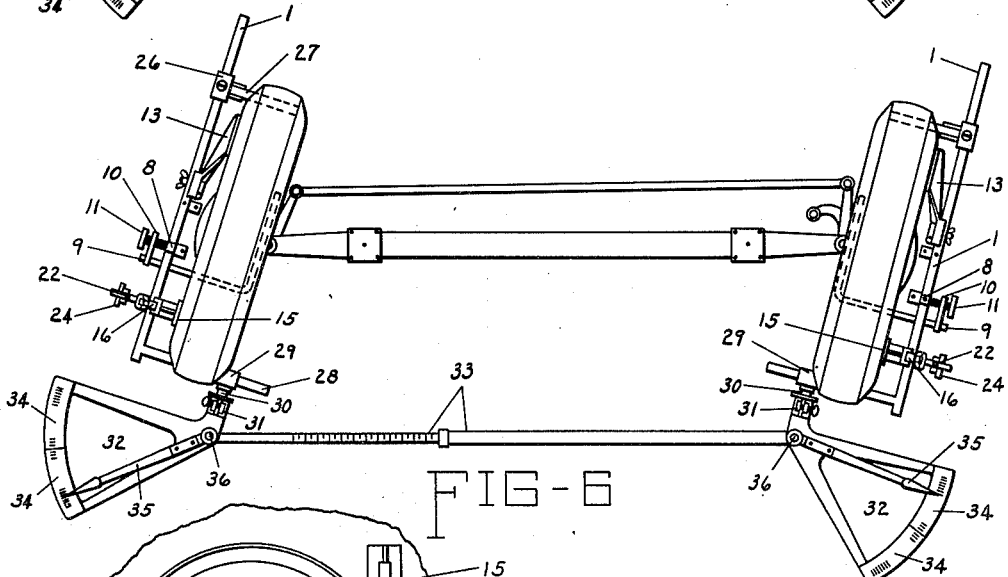
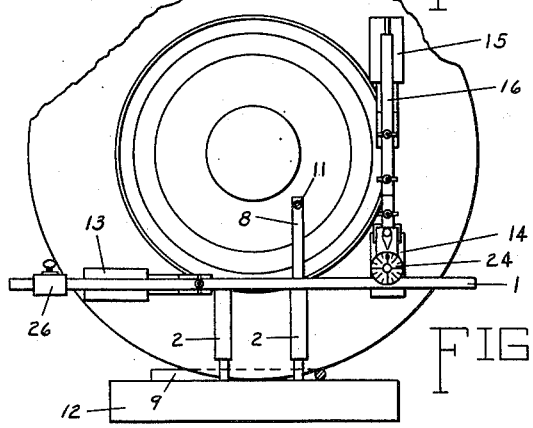

Sept. 12, 1950     R. D. SMITH     2,522,066
AUTOMOBILE ALIGNMENT GAUGE

Filed Feb. 7, 1946     3 Sheets-Sheet 3

INVENTOR.
BY Roy D. Smith
Merrill M. Blackburn
Atty.

Patented Sept. 12, 1950

2,522,066

UNITED STATES PATENT OFFICE 2,522,066

AUTOMOBILE ALIGNMENT GAUGE

Roy D. Smith, Mertzon, Tex., assignor to Bee-Line Company, Scott County, Iowa, a copartnership Application February 7, 1946, Serial No. 646,009

5 Claims. (Cl. 33—203.17)

1

The present invention relates to a method of and apparatus for measuring the relative alignment of the dirigible wheels of a motor vehicle in order to produce the best results. It is particularly useful in checking the alignment conditions of a motor vehicle in which one or both of the front wheels have lateral wobble.

Among the objects of this invention are the provision of an improved apparatus for checking the alignment of motor vehicle wheels; the provision of a new mode of operation which will eliminate errors which are common in connection with methods of checking which are now prevalent in this art; and such further objects, advantages, and capabilities as will hereafter appear and as are inherent in the apparatus and method disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 5 represents a plan view of the front wheels and axle of a vehicle, in a position for running straight ahead, with the gauging apparatus in position for testing toe-in and toe-out;

Fig. 6 represents a view similar to that of Fig. 5 except that the wheels are in position for the making of a right hand turn;

2

Figure 7:
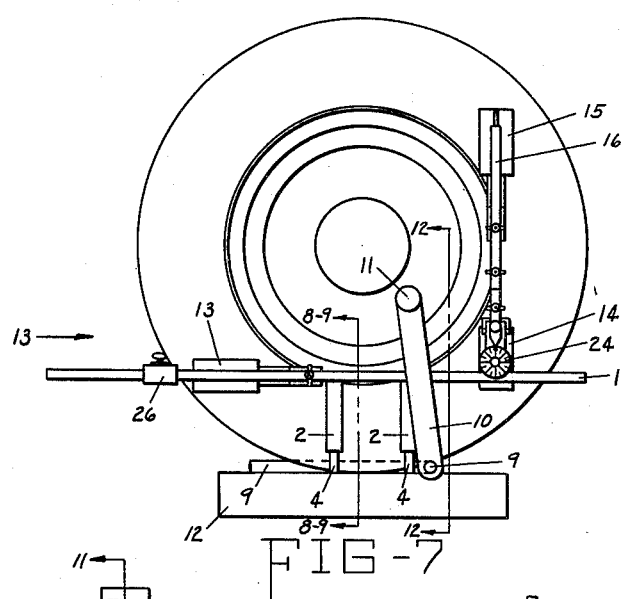
Fig. 7 represents a side elevation of a vehicle wheel with a gauge attached for a checking operation.
Figure 13:
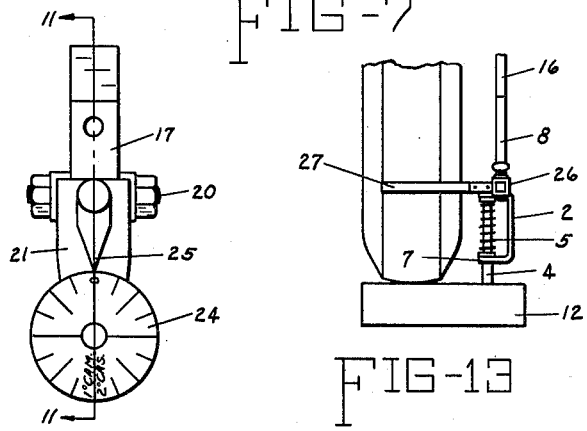
Figure 10:
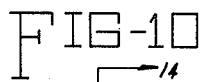
Fig. 10 represents a side elevation of the camber-gauging element shown in Fig. 7.
Figure 11:
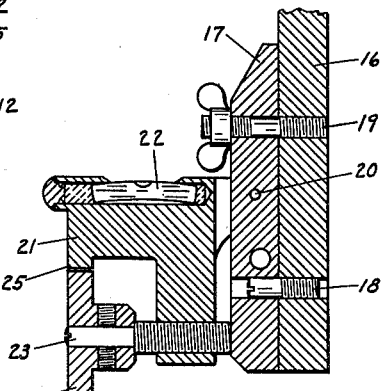
Figure 12:
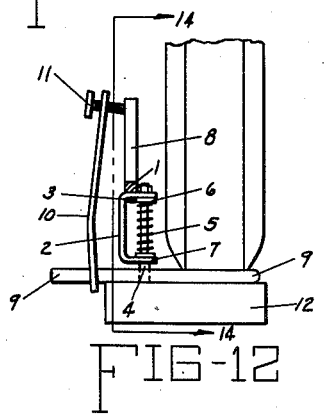

Fig. 11 represents a section of the camber-gauging element as if taken substantially on the plane indicated by the line 11—11, Fig. 10;

Fig. 12 represents a partial section taken substantially along the plane indicated by the line 12—12, Fig. 7, the same showing how the gauge mechanism is held to the tire;

Fig. 13 represents an elevation of the checking apparatus shown in Fig. 7, taken in the direction of the arrow 13 in that figure; and Fig. 14 represents a sectional elevation of the gauging apparatus shown in Fig. 7, taken substantially along the plane indicated by the line 14—14, Fig. 12.

Reference will now be made in greater detail to the annexed drawings for a more complete description of this invention. In this apparatus, a rectangular elongated bar or body 1 is secured to a pair of U-shaped brackets 2 by means of bolts 3. The arms of these brackets have openings therethrough for the reception of the bolts 4, each provided at one end with a collar to be engaged by a spring 5, surrounding the bolt 4, the second end pressing against the upper arm of the bracket, as shown at 6. This forces the bolt downwardly until it is stopped by the other arm 7 of the bracket 2. As shown clearly in Fig. 12, a post 8 rises from the bar 1, being connected rigidly thereto by the bolt 3, which is screwed into a screw-threaded opening extending longitudinally into one end of the post 8.

Figure 9:
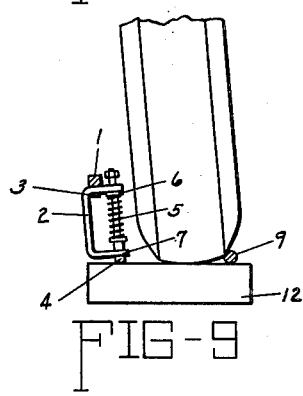
Fig. 9 represents a view similar to that of Fig. 8 but with the wheel tilted to show excessive camber.

The bolts 4 serve as legs to support the bar 1 and associated parts above the floor or supporting means 12. If the wheel has a considerable amount of caster, it is necessary for the legs 4 to yield upwardly as the wheel is turned to the right or left. This action is made possible by the springs 5 which, as shown in Fig. 9, are compressed by the upward movement of the legs. There is, of course, a limited amount of this upward movement of the legs, due to normal camber, but it is increased by increase of camber due to caster action. Were it not for the upward yielding of the legs, they would be forced away from the wheels when they are turned to right and left.

An L-shaped rod 9 has one arm in front of the wheel and the other arm inside of the wheel, as shown clearly on sheets 2 and 3 of the drawings. A bar 10 has, in one end thereof, an opening which is slightly larger than the bar 9, which opening serves to receive the end of the latter bar, as shown clearly in Figs. 7 and 12. The other end of the bar 10 has a screw-threaded opening therethrough for the reception of the bolt 11 which engages the upper end portion of the post 8 and serves, when screwed in, to push the post 8 toward the wheel as far as is permitted by the rest of the apparatus, about to be explained.

Figure 8:
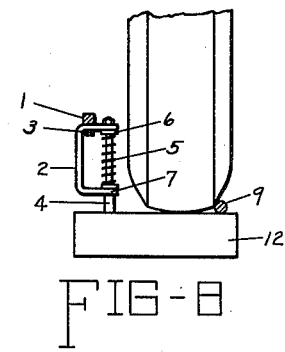
Fig. 8 represents a partial sectional elevation substantially along the plane indicated by the line 8—8, Fig. 7, the wheel being indicated in a vertical position.

As shown clearly in Figs. 8 and 9, the arm of bar 9 which is inside of the wheel fits closely within the angle between the tire and the support 12. The bar 9 can therefore not be moved outwardly because stopped by the tire and cannot swing downwardly because stopped by the support 12. It is thefore a rigid support for the bar 10 and enables the screw or bolt 11 to push the post 8 inwardly as far as it can go. However, there is on the bar 1 an abutment 13 and on the bar 16 abutments 14 and 15 which definitely position the apparatus with relation to the tire. The bar 16 is immovably connected to the bar 1, either by means of a screw or by being welded thereto, and therefore any rotation of the latter, by reason of turning the screw 11 into the bar 10, would tend to cause movement of the upper end of the bar 16 toward the tire. However, this is prevented by engagement of the abutment 15 with the tire, as shown in Fig. 7. The three abutments 13, 14, 15 form a triangle and it is approximately at the center of the figure of this triangle that the force of screw 11 is transmitted to the post 8. Therefore, the pressure upon these three abutments is substantially equal and inward movement of the post 8 and bars 1 and 16 is resisted by the tire.

Since tires differ in size, it is necessary to have the abutments 13, 14, 15 relatively adjustable; and this is provided for by making the abutments 13 and 15 adjustable along the bars 1 and 16. A block 17 is positioned with relation to the lower end of the post or bar 16 by a pin 18 and a bolt 19, as shown in Fig. 11. A pivot member 20 pivotally connects the block 21 to the block 17. In the upper end of the block 21, as shown in Fig. 11, is a level 22, the use of which will be presently explained. In the lower end of the block 21 is a screw 23 which is used for adjusting the block 21 with relation to the block 17. On the end of this screw 23 is secured a head 24 by means of which the screw may be turned for adjusting the blocks relatively. The head 24 is graduated, as shown in Fig. 10, for use in measuring camber and caster. The graduations on the head 24 cooperate with an indicator 25 on the block 21. With the wheels set for running straight ahead, the head or knob 24 is turned until the level 22 indicates zero inclination and the amount of camber is read from the graduations on the face of the head.

A sleeve 26 is adjustably mounted on the bar 1 and carries a laterally projecting arm 27 which is adjusted to engage the back face of the tire while the arm 28 fixed to arm 1, at a right angle to the plane of arms 1 and 16, engages the front face of the tire. These two arms 27 and 28 therefore definitely position the bar 1 with relation to the tire. On the arm 28 is slidably mounted a sleeve 29, which has an arm 30 projecting forwardly therefrom. A socket 31 connected to the protractor 32 fits around the arm 30, and the two protractors 32 on opposite sides of the vehicle are brought into cooperative relation by the longitudinally extensible bar 33, one element of which is graduated to show changes in distance between the two tires. The sockets 31 may be secured to the arm 30 by a clamp, as clearly indicated in Fig. 6. The two arcs 34 of each sector of protractor 32 are graduated in angular measurement for use in reading toe-in. The pointers 35 are connected through members 36 pivotally mounted in frames or protractors 32, with the two sections of the connecting bar 33, and it is quite apparent that, as the wheels are turned from right to left or left to right, the two pointers 35 swing from the forward section of arc 34 to the rearward section thereof, or vice versa. It is also clear that, when the wheels are set to run straight ahead, with a normal amount of toe-in, the pointers point slightly to the rear of the zero lines at the middle of these sectors, as shown in Fig. 5.

An alternative method of measuring toe-in or toe-out of vehicle wheels is shown in Fig. 5 by the dotted lines 41 and 42. In this method, a measuring scale graduated in inches and fractions thereof is used to measure the distance between the bars 1. The distances should be measured substantially in vertical planes tangent to the treads of the tires. The measurement having been taken at the front of the tires, the measuring scale is then moved to the rearward portion of the bars 1 and a similar measurement taken along line 42. If the distance is greater along line 42 than along line 41, the vehicle wheels are toed in an amount equal to the difference in the two measurements.

In order to determine if there is wheel wobble and, if so, the point of greatest wobble, or runout, scribers are set on the supports 12, when the front axle of the vehicle has been raised to lift the wheels off the supporting means and, with the wheels rotating, the scribers are moved in until the crayon or other marking material 38 contacts the tire whereby a mark 39 is placed on the side wall of the tire. The marks 39 indicate what part of the tires have the greatest outward motion. These marks are then made use of in determining the relative wheel alignment of the wheels, as hereinafter set forth.

*Method of operation*

Figure 1:
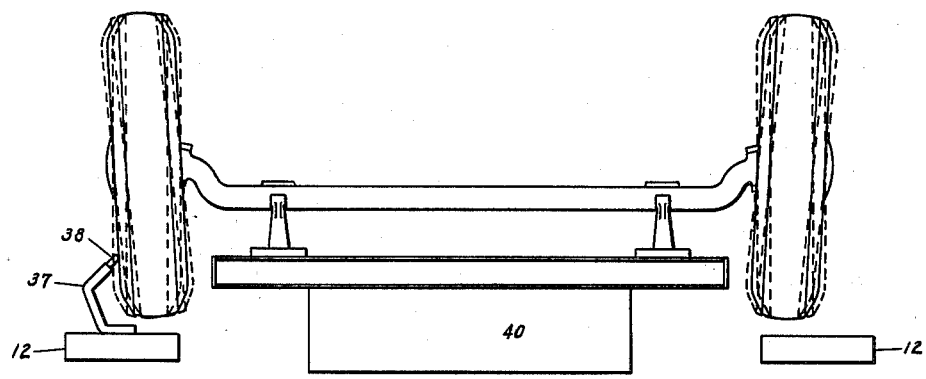
Fig. 1 represents an elevation of the front wheels and connecting axle of a vehicle, with the tires raised from the supporting surface.
Figure 2:
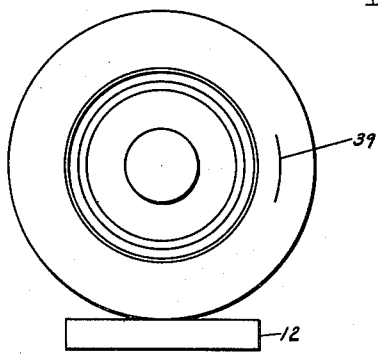
Figs. 2 and 3 represent side elevations of the front wheels of a motor vehicle, of which Fig. 2 may be considered as representing the right wheel and Fig. 3 the left wheel.
Figure 3:
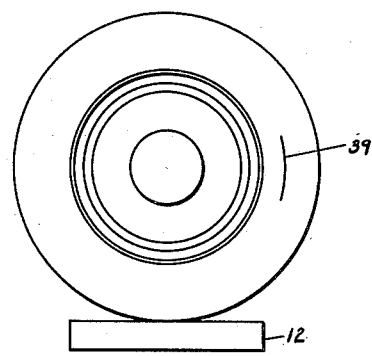

The method of operation with the present mechanism will next be described. Any suitable means 40, which may include jacks, is used for raising the wheels off from the supporting means 12, which may be a floor or blocks placed under the wheels. If the wheels are not already set for running straight ahead, they are next set in this position. A scriber 37 is then placed on the support 12 with the marking element 38 a little distance from the tire which is then set in rotation about its spindle. The scriber is then gradually moved toward the tire until the latter contacts the marking element 38, when a line 39 will be scribed on the tire side wall. If the wheel has no wobble, this line will be continuous about the tire but, if there is any wobble, the line 39 will be a short line or a longer line, depending upon how much the wheel is out of true. Figs. 2 and 3 show substantially the same amount of wobble of the right and left front wheels of a motor vehicle.

Figure 4:
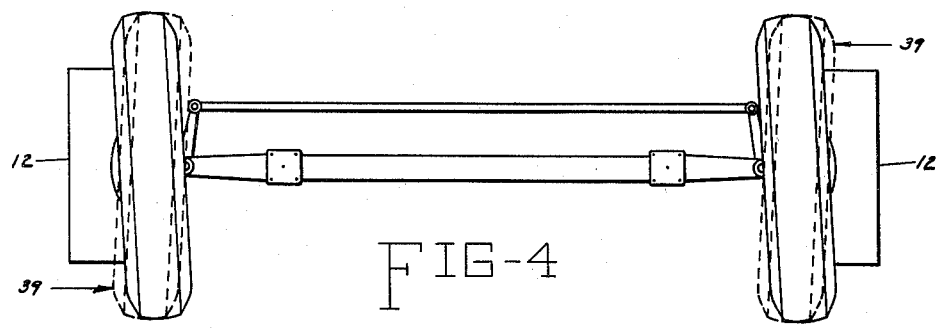
Fig. 4 represents a plan view of the front wheels of a motor vehicle with the points of wheel runout indicated by the arrows 39.

After scribing a reference mark 39 at the point of greatest wheel wobble on the side wall of each tire, the axle is lowered to cause the wheels to rest on the supporting means 12, with the mark 39 on one wheel toward the front of the vehicle and the corresponding mark 39 on the other wheel toward the rear of the vehicle. Since few vehicle wheels run true, it follows that, when using other gauging equipment, the wheel wobble may cause errors in testing wheel alignment. When the present method is used, the errors of wheel wobble will be neutralized so that true and accurate readings may be obtained. Fig. 4 shows the use of this method, the line 39 of the right hand wheel being in front of the axle and at the same elevation from the support 12, while at the opposite side of the vehicle, the line 39 on the left hand tire is to the rear of the axle and the same distance from the support 12. Hence, the deviation of the wheel from true position does not give a greater or less distance between the wheels than the true reading. Therefore, when readings are made with the wheels set as indicated, there will not be a distorted reading, as would be the case if the wheels were not set as indicated herein. For example, if the scribed lines were both in front of the axle, then there would be a greater reading between the wheels than the true reading. On the other hand, if the scribed lines were both to the rear of the axle, then the distance between the tires, in front of the axle, would be less than the correct reading. It therefore follows that, if the wheels are in the positions indicated in Fig. 4, that is, with one scribed line in front of the axle and the other to the rear of the axle, and the gauging apparatus is applied, as indicated in Fig. 5, it would be possible to get a true reading, rather than one distorted by the wheel wobble.

It should be noted, in connection with the discussion just preceding, that this operation tends to eliminate errors when making toe-in readings. Since the points of maximum wheel wobble are placed in a horizontal position, the result is that the wobble has no effect in a vertical plane when gauging for the camber angle.

If it were to be found that one wheel was running perfectly true, with no wobble or run-out, and the other wheel wobbled a substantial amount, correction can be made by noting the amount of wobble and compensating for it in making a toe-in reading by adding or subtracting one degree for each half inch (½") of wobble, with conventional sizes of automobile wheels.

It will of course be understood that the specific description of structure set forth above may be departed from without departing from the spirit of this invention as disclosed herein and as defined in the appended claims.

Having now described my invention, I claim:

1. In a wheel-checking apparatus, in combination, a pair of wheel-gauging units, one connected to each of the oppositely positioned wheels of a vehicle, each unit comprising two bars rigidly connected at a right angle to each other, supports connected to one of said bars and adapted to rest on a floor or other supporting means to support said bar alongside of a wheel, tire-engaging abutments on said bars adapted to be pressed against the side wall of the tire, means for pressing the abutments against the tire with substantially equal pressure, means for holding the last mentioned means against being pressed away from the tire, and means connected to the two bars provided with supports for measuring the distance between the tires carried by the vehicle axle, at opposite sides of the vehicle.

2. In a wheel-checking apparatus, in combination, a pair of bars rigidly connected at a right angle to each other, supports connected to one of said bars and adapted to rest on a floor or other supporting means to support said bar alongside of a wheel, tire-engaging abutments on said bars adapted to be pressed against the side wall of the tire, means for pressing the abutments against the tire with substantially equal pressure, means for holding the last mentioned means against being pressed away from the tire, and means connected to said bars for measuring the angular relations of the tires on the two ends of the axle, in different positions of turning adjustment.

3. In apparatus for checking the geometry of the dirigible wheels of a motor vehicle, a pair of bars, one of them substantially horizontal and the second one substantially vertical, secured together in a plane and at substantially a right angle to each other, abutments secured to said bars to bear against the side wall of a tire, one of said abutments being located approximately at the junction of said bars and two other abutments carried by said bars remote from said junction, legs extending downwardly from one of said bars to support the weight thereof and of the parts connected thereto, an L-shaped rod, one arm of which is located at the inner side of the wheel adjacent its point of contact with the wheel-supporting surface, the other arm being located forwardly of the wheel and extending transversely thereof close to the wheel, a substantially vertical pressure bar movably connected to the second arm of said L-shaped rod, a substantially vertical post rising from the substantially horizontal one of said pair of connected bars, and the substantially vertical bar connected to the second arm of said rod having a screw extending therethrough, operatively engaging said vertical post, the abutments connected to said pair of bars positioning said pair of bars parallel to a wheel in connection with which the apparatus is used.

4. In an apparatus of the class indicated, a mechanism to be placed at the side of a vehicle wheel for use in checking the steering geometry of the vehicle, comprising a bar which is substantially horizontal during use, a second bar secured to the first bar and extending substantially vertically therefrom, abutments on said bars to hold them a fixed distance from the wheel, legs connected to the horizontal bar to support the same at the side of the wheel, and means for pressing said bars and abutments toward the wheel, said legs comprising a broadly U-shaped frame having a vertically movable supporting element slidable through the arms of the U-shaped frame and spring means to force the movable supporting element downwardly into contact with the surface on which the wheel is supported.

5. Measuring means, for use with a motor vehicle to measure the angles connected with the steering of the vehicle, comprising a pair of substantially identical members to be applied to the outer lateral faces of the dirigible wheels of a vehicle and a longitudinally extensible and contractible bar connecting said members in front of the wheels, each of said substantially identical members comprising a bar supported horizontally at the side of the wheel, a horizontally extending bar rigidly connected to the first mentioned bar at the side of the wheel and extending inwardly, transversely of the wheel in front thereof, a sleeve adjustable along the first mentioned bar, a transversely extending bar adjacent the opposite end of the first mentioned bar at the side of the wheel, a sleeve adjustable along the horizontally extending bar, resiliently yieldable legs supporting the first mentioned bar at the side of the wheel and permitting vertical motion thereof as the wheel is turned from right to left or vice versa, a graduated sector connected to the last mentioned sleeve and swinging laterally with the wheel with which it is associated, and a pointer pivotally connected to the sector and rigidly connected to an end portion of the extensible bar whereby to cause swinging of the pointer over the sector as the wheels of the vehicle are turned laterally.

ROY D. SMITH.

REFERENCES CITED

The following references are of record in the file of this patent:

UNITED STATES PATENTS

| Number | Name | Date |
|---|---|---|
| 1,324,388 | Duby | Dec. 9, 1919 |
| 2,045,109 | Smith | June 23, 1936 |
| 2,046,529 | Morse | July 7, 1936 |
| 2,090,294 | Haucke | Aug. 17, 1937 |
| 2,137,485 | Greenleaf et al. | Nov. 22, 1938 |
| 2,235,321 | Krumm | Mar. 18, 1941 |

FOREIGN PATENTS

| Number | Country | Date |
|---|---|---|
| 504,756 | Great Britain | May 1, 1939 |